United States Patent [19]

Lama et al.

[11] Patent Number: 4,571,022
[45] Date of Patent: Feb. 18, 1986

[54] TWO ROW REDUCTION/ENLARGEMENT GRADIENT INDEX LENS ARRAY

[75] Inventors: William L. Lama, Webster; James D. Rees, Pittsford, both of N.Y.

[73] Assignee: Xerox Corporation, Stamford, Conn.

[21] Appl. No.: 598,756

[22] Filed: Apr. 10, 1984

[51] Int. Cl.⁴ .............................................. G02B 5/17
[52] U.S. Cl. .............................. 350/96.25; 350/96.31
[58] Field of Search ............... 350/96.18, 96.24, 96.25, 350/96.31, 96.27, 413; 355/1

[56] References Cited

U.S. PATENT DOCUMENTS

| | | | |
|---|---|---|---|
| 3,658,407 | 4/1972 | Kitano et al. | 350/96 B |
| 4,331,480 | 5/1982 | Rees et al. | 350/96.25 |
| 4,405,207 | 9/1983 | Kay | 350/96.25 |
| 4,462,662 | 7/1984 | Lama | 350/96.27 |
| 4,509,826 | 4/1985 | Araghi | 350/96.27 |

OTHER PUBLICATIONS

"Gradient-Index Optics: A Review", by Duncan T. Moore, Applied Optics, 1 Apr. 1980, vol. 19, No. 7, pp. 1035–1038.

*Primary Examiner*—William L. Sikes
*Assistant Examiner*—Robert E. Wise

[57] ABSTRACT

An exemplary two-row design for a reduction/enlargement gradient index lens is provided. The gradient index fibers of each row are aligned in the length direction so that the fiber axis lies along respective symmetrical planes. These planes are tilted with respect to each other and with respect to a plane normal to the object and image planes by some small angle. The array images objects in an object plane onto an image parallel plane of a magnification dependent on the system parameter. In this configuration, the center fiber of one row is aligned such that a plane extending through the axis of the center fiber in the width direction of the lens makes a right angle with the object and image planes. A further characteristic of the two-row array is that adjacent fibers in adjoining rows are offset to provide the required contiguous image at the image plane and to optimize the exposure uniformly.

3 Claims, 5 Drawing Figures

TWO ROW REDUCTION/ENLARGEMENT GRADIENT INDEX LENS ARRAY

BACKGROUND AND PRIOR ART STATEMENT

The present invention relates to gradient index optical fibers and, more particularly, to a two-row bundled array of such fibers forming a lens array which transmits an image of an object at an object plane to an image plane at a magnification other than unity.

Image transmitters comprising bundled gradient index optical fibers are known in the art. U.S. Pat. No. 3,658,407 describes a light conducting fiber made of glass or synthetic resin which has a refractive index distribution in a cross-section thereof that varies parabolically outward from a center portion thereof. Each fiber acts as a focusing lens to transmit part of an image of an object placed near one end. An assembly of fibers, in a staggered two-row array, transmits and focuses an image, at 1:1 magnification, of the object. The fiber lenses are produced under the trade name SELFOC; the mark is registered in Japan and owned by Nippon Sheet Glass Co., Ltd.

Numerous techniques are known in the art for manufacturing glass or plastic fibers with index-of-refraction variations. These are usefully summarized in an article entitled "Gradient Index Optics: A Review" by Duncan T. Moore, Applied Optics, 1 Apr. 1980, Volume 19, No. 7, pp. 1035-1038.

It is also known in the art to construct a gradient index lens array capable of forming reduced or enlarged images of a document. Such a lens array is disclosed in U.S. Pat. No. 4,331,380. In this patent, specific designs are provided for a one-row array while variations of a two-row design are more broadly disclosed. It is an object of the present invention to provide an improved embodiment of a two-row design. More specifically, the present invention relates to an optical system for transmitting an image of an object lying in an object plane onto a parallel image plane at a magnification other than unity, said system comprising a gradient index lens array having a plurality of gradient index optical fibers aligned in two rows, the optical centers of each row lying along a symmetrical axis extending along the length direction of the lens array, each fiber in each row having an axis which is substantially nonparallel to the axes of adjoining fibers, the array further characterized by one row having a center fiber through which a plane extended in the width direction forms a right angle with said object and image planes.

DRAWINGS

DESCRIPTION

Figure 1:
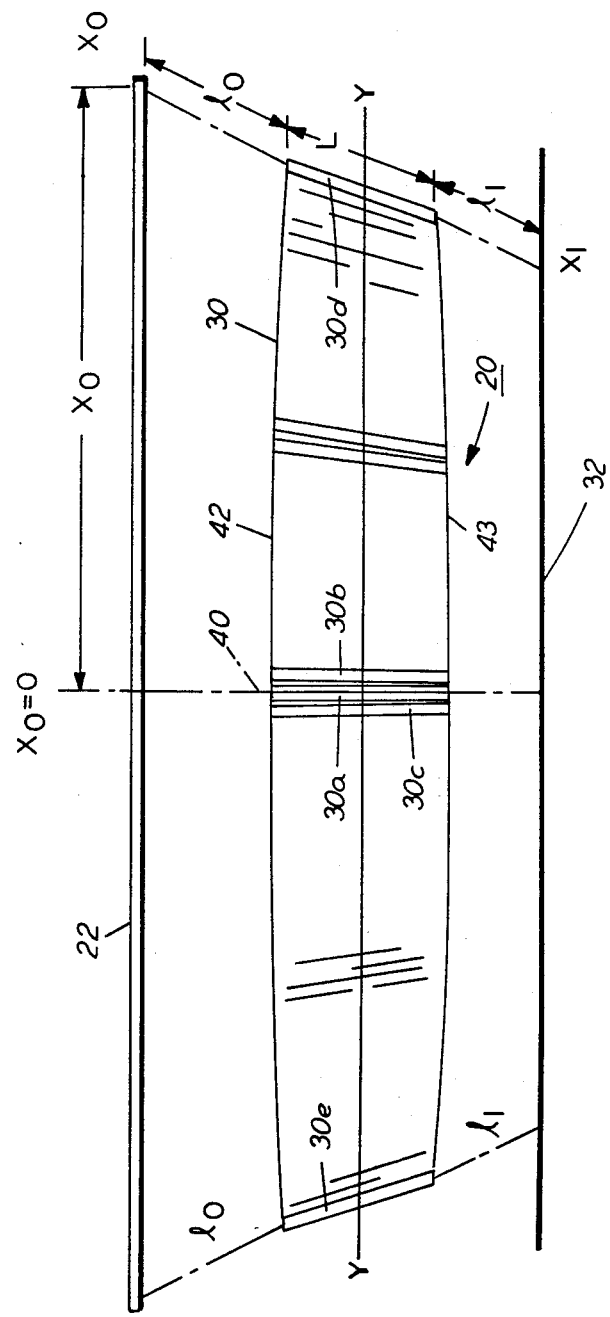
FIG. 1 is a frontal view of a prior art imaging system utilizing a one-row gradient index lens array.

Referring now to FIG. 1, there is shown a front view of a prior art one-row reduction gradient index lens array constructed according to the principles set forth in U.S. Pat. No. 4,331,380 whose contents are hereby incorporated by reference.

An object 22, which can be a document located in an object plane, is moved past lens array 20 in a direction extending into the page. An illumination means (not shown) provides intense illumination onto successive narrow strips of the document running parallel to the lens array (X-direction). Lens array 20 comprises a single row 30 of optical fibers. In operation, document 22 is moved past the illuminated area at a speed appropriate to the particular magnification and to the speed of image plane 32 which can be a photosensitive sheet, moving in the same direction as the document. Light reflected from the document is transmitted by lens array 20 as a reduced image onto sheet 32. The reduced image is formed as a contiguous and overlapping plurality of reduced images from each individual fiber, as described more fully in U.S. Pat. No. 4,331,380.

For illustrative purposes, assume that document 22 is an A3 original (width=297 mm) which is to be reduced to A4 size (210 mm), i.e. lens 20 is a 0.707X lens. Lens array 20 comprises a plurality of individual gradient index fibers 30a, 30b, 30c, 30d, 30e, . . . which have the same radius, (e.g. 0.5 mm); the same axial index of refraction and the same index gradient. The fibers differ from each other in length and in orientation of the fiber axis and in the orientation of their end faces with respect to the object and image planes and in the orientation of their end faces with respect to their axes. As shown, fiber 30a at the center of the array ($X_o=0$) is in vertical orientation, i.e. its axis 40 is perpendicular to the object and image planes. The axes of adjoining fibers, i.e. 30b, 30c are slightly displaced from the perpendicularity condition, the displacement continuing out to the fibers at the ends of the array. The interfiber displacement value may be a constant value but other values are possible. The spaces 41 between fibers can be filled with a black silicon resin for light absorbing purposes, as is known in the art.

The light ray from the document that passes down the geometrical axis of an endmost fiber 30d (i.e. the central axial light ray for fiber 30d) images document point $X_o=148.5$ mm at the reduced photoreceptor point $X_1=m_o X_o=105.0$ mm, where $m_o$ is the desired magnification (0.707). The relationship $X_1=m_o X_o$ is maintained for the central axial ray passing through each fiber of the array, and the object and image vertex distances ($l_o$, $l_1$) are chosen to provide the correct magnification near the central axial ray of each fiber.

The lens assembly, as a whole, lies in a vertical plane which is perpendicular to the object plane but the lens is comprised of a plurality of fibers with a plurality of axes, each axis, save the axis of a central fiber, forming a different angle with respect to a line normal to the object plane.

This orientation results in the total conjugate of the light path through each fiber changing from a first value at the center fiber to progressively higher values at the endmost fibers. To accommodate this conjugate change, the lengths of the fibers are progressively decreased from the center outward. A grinding and polishing operation results in the formation of the two smooth convex faces 42, 43.

A single-row array is suitable for some imaging applications. A two-row array, while more costly, doubles the exposure at the image plane and improves image exposure uniformity by reducing exposure modulation caused by the discrete nature of the fiber array. Several two-row configurations are disclosed in said '380 patent. A first embodiment showed the two-rows positioned parallel to each other and separated by a specified distance. In a second embodiment, the two-rows were again parallel but were arrayed flush with no intervening space. A third variation shows the joining of the two rows at the imaging face with the fibers tilted at some degree of tilt. According to the present invention, a fourth, and improved embodiment of a two-row array is formed by using a tilted arrangement with the imaging faces separated by a small distance. According to another aspect of the invention, a first fiber row is positioned with a centrally located fiber positioned so that it maintains a right angle orientation with a plane through the fiber optical axis and the object and image planes. A second row is displaced laterally (in the array direction) by a specified distance from adjoining fibers in the first row. However, the second row does not have a centrally located fiber corresponding to the central fiber in the first row. These row-to-row characteristics are set forth more fully below.

Figure 2:
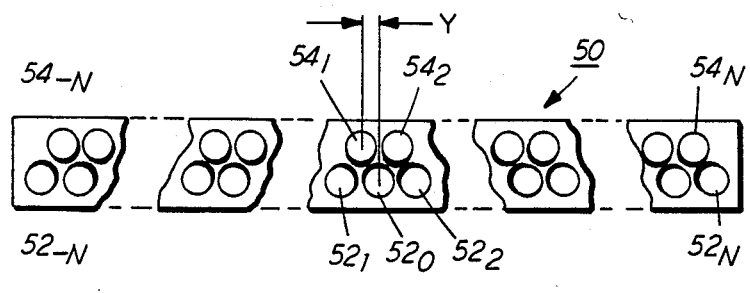
FIG. 2 illustrates a top view of the two-row gradient index lens array according to the present invention.
Figure 3:
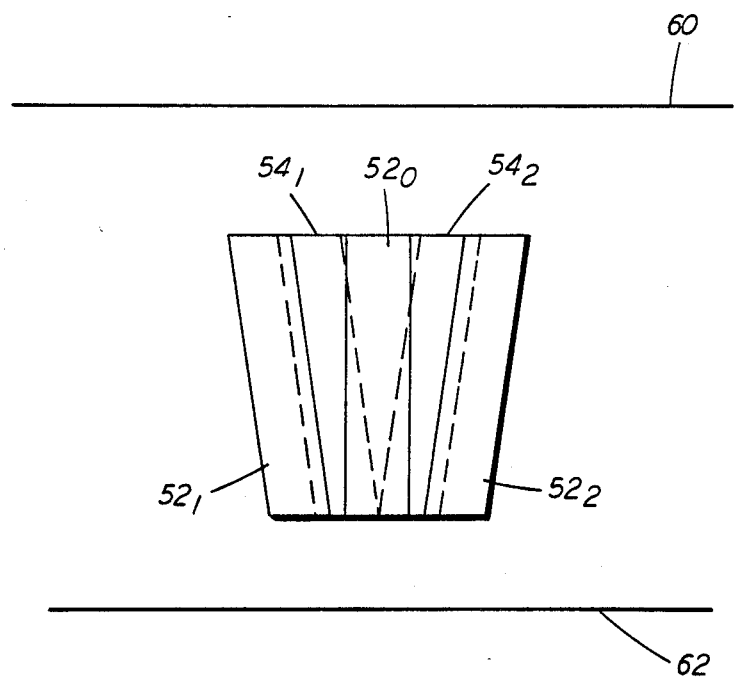
FIG. 3 is a side view of the central portion of the lens array of FIG. 2, shown in exaggerated detail.

FIG. 2 illustrates a top view of a linear two-row gradient index lens array. FIG. 3 illustrates an enlarged central side view of the array and FIG. 4 an end view. As shown, lens array 50 comprises two rows, 52 and 54, each row comprising a plurality of optical fibers $52_0$-$52_N$ and $54_1$-$54_N$, respectively. The fibers in each row are arranged in the fan-fold configuration characteristic of a reduction/enlargement array disclosed in said '380 patent with, however, certain distinctions described below. Array 50 has a perpendicular orientation with respect to object plane 60 and an image plane 62. The individual fibers comprising each row 52, 54 have an orientation with respect to these planes, and to each other, as described in more detail below.

Figure 4:
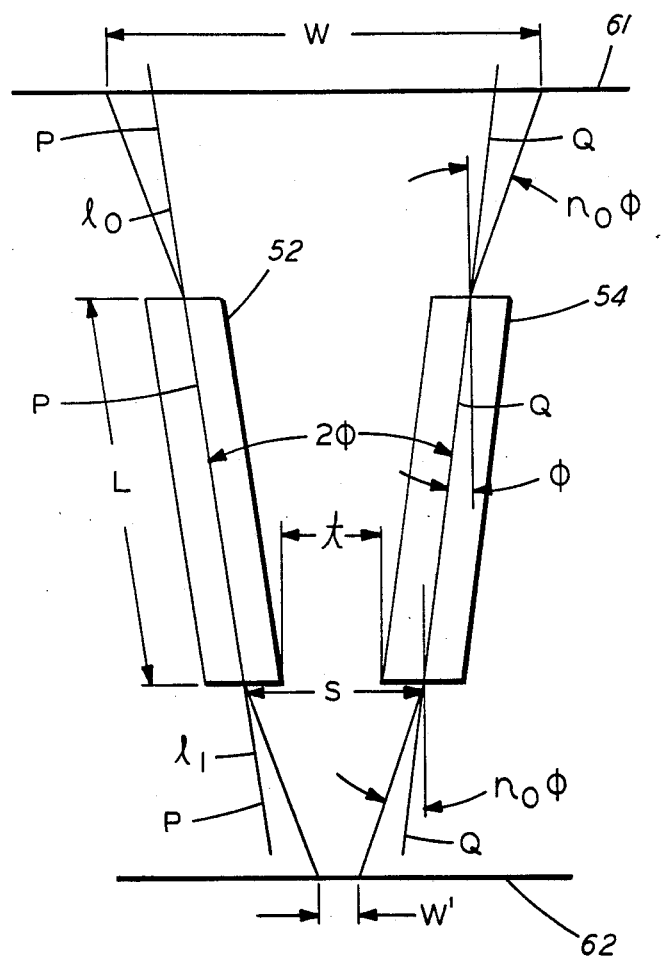
FIG. 4 is an end view of the two-row array showing the tilt angle relationship between the two rows.

Unlike the lens assembly 20 shown in FIG. 1, the center axis of each row 52, 54 as shown in FIG. 4, lies along planes P, Q respectively, each plane extending along the length direction of the array and extending in the length inclined at some angle $\phi$ with respect to a line normal to the object and image planes. Each fiber in rows 52, 54 is aligned symmetrically along the same axis. However, and with reference to FIG. 3, which shows a side view of the central portion of array 50, if one considers a plane extending through the center of each fiber into the page, (the width direction of the array) only one fiber, $52_0$ is arrayed in a condition which results in a right angle between such a plane extending into the page and object and image planes 60, 62. Adjacent fibers $52_1$, $52_2$ are tilted away from central fiber $52_0$, and, as shown in FIGS. 2 and 3, none of the fibers in row 54 have a central position with the right angle characteristics of fiber 52. And, as shown in FIG. 4, the center line of fibers in rows 52, 54 at the end face are separated by a distance S, with the adjoining fiber edges separated by a distance t.

Figure 5:
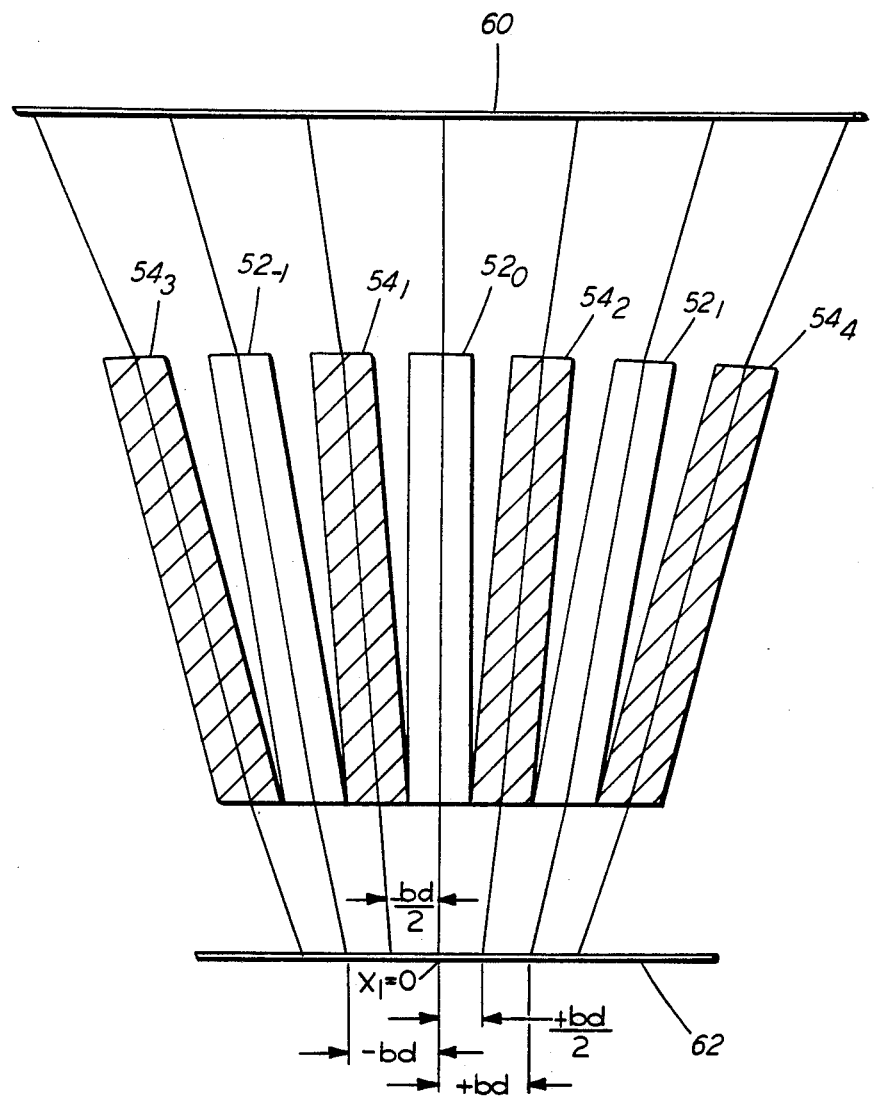
FIG. 5 shows axial ray image plane intersections at a central portion of the array.

FIG. 5 shows a central axial ray intersection at the image plane for the center fibers of rows 52 and 54. The spacing between the fibers has been exaggerated for descriptive purposes; the actual configuration is the alternate staggered rows shown in FIGS. 2 and 3. As shown, the object light rays from object plane 60 pass down the geometrical axis of the fibers (the central axial rays) of row 52, intersect the image plane 62 at points $X_1=0$, $X_1=\pm bd$, $=\pm 2 bd$; $=\pm 3 bd$ ... where d is the fiber diameter and b is a constant of order unity. For row 54, the central axial rays intersect the image plane at points $X_1=\pm bd/2$; $\pm 3 bd/2$; $\pm 5 bd/2$ .... Thus, projections of the optical fibers overlap to provide an optimization of the exposure uniformity.

For the configuration shown in FIG. 4 it has been determined that the tilt angle $\phi$ required for proper imaging at the image plane is given by the expression.

$$m = \frac{s - 2l_l \sin(n_o\phi)}{s + 2L \sin \phi + 2 l_o \sin(n_o \phi)} \quad (1)$$

where L is the fiber length, $n_o$ is the axial refractive index and S is the distance between the axial midpoint of the two rows at the fiber exit face. Equation 1 may be solved numerically for $\phi$ for any given magnification m. In typical cases the tilt $\phi$ is small and Eq (1) may be solved analytically, yielding $$\phi = \frac{s(1 - m)}{2(mL + ml_o n_o + l_1 n_o)} \text{ (radians)}$$

The total angle between the two rows is ($2\phi$) and the relationships between the distances w and w' must satisfy the expression mw = w'.

A specific example of a two-row gradient index lens array designed for a reduction of 0.744X or enlargement of 1.344X is provided in the listing below. Row 52 comprises 221 fibers; row 54, 220. Each fiber has the following parameters: radius R=0.473 mm; axial refractive index ($n_o$=1.543 at 500 nm; gradient constant $\sqrt{A}$=0.1288 mm$^{-1}$ at 500 nm. The vertex distance $l_o$ at the center is 21.48 mm; center fiber $52_0$, of row 52 has a length L of 28.60 mm; $l_1$ distance at the center 15.62 mm for a total center conjugate of 65.70 mm. Total conjugate at the array ends increases to 75.75 mm; $l_o$ increases to 28.10 mm, L decreases to 27.21 mm and $l_1$ increases to 20.44 mm. Table 1 below lists departure from the perpendicularity condition (tilt) for the fibers for ½ of each row (right half measured from center; left half of each row is symmetrical; Xc sign would change) together with the distance from the center point ($X_c$). ($X_c$ is the distance from the center of each fiber to the center of fiber $52_0$ measured along the center axis of the array, e.g. line Y—Y of FIG. 1 represents the center line of array 20; a similar line can be drawn for lens array 50). For this example, s is chosen to be 2.20 mm and $\phi$, solving equation 1, is 0.004 radians or 0.23. The distance t between the end face of the two rows is then 2.20−(0.0473)2=1.25 mm.

TABLE

| | ROW 52 | | | ROW 54 | |
|---|---|---|---|---|---|
| FIBER | TILT (DEG) | XC(MM) | FIBER | TILT (DEG) | XC(MM) |
| 0 | .000 | .000 | 0 | NONE | |
| 1 | .223 | 1.13 | 1 | .109 | .56 |
| 2 | .451 | 2.25 | 1 | .337 | 1.69 |
| 3 | .679 | 3.38 | 3 | .565 | 2.82 |
| 4 | .0907 | 4.51 | 4 | .793 | 3.94 |
| 5 | 1.134 | 5.63 | 5 | 1.020 | 5.07 |
| 6 | 1.361 | 6.76 | 6 | 1.247 | 6.20 |
| 7 | 1.587 | 7.89 | 7 | 1.474 | 7.32 |
| 8 | 1.813 | 9.01 | 8 | 1.700 | 8.34 |
| 9 | 2.938 | 10.14 | 9 | 1.926 | 9.58 |
| 10 | 2.264 | 11.27 | 10 | 2.152 | 10.70 |
| 11 | 2.489 | 12.39 | 11 | 2.377 | 11.83 |
| 12 | 2.714 | 13.52 | 12 | 2.602 | 12.96 |
| 13 | 2.938 | 14.65 | 13 | 2.826 | 14.08 |
| 14 | 3.162 | 15.77 | 14 | 3.050 | 15.21 |
| 15 | 3.385 | 16.90 | 15 | 3.273 | 16.34 |
| 16 | 3.608 | 18.03 | 16 | 3.497 | 17.46 |
| 17 | 3.830 | 19.15 | 17 | 3.719 | 18.59 |
| 18 | 4.052 | 20.28 | 18 | 3.941 | 19.72 |
| 19 | 4.274 | 21.41 | 19 | 4.163 | 20.84 |

TABLE-continued

| FIBER | ROW 52 TILT (DEG) | XC(MM) | FIBER | ROW 54 TILT (DEG) | XC(MM) |
|---|---|---|---|---|---|
| 20 | 4.495 | 22.53 | 20 | 4.385 | 21.97 |
| 21 | 4.716 | 23.66 | 21 | 4.605 | 23.10 |
| 22 | 4.936 | 24.79 | 22 | 4.826 | 24.22 |
| 23 | 5.155 | 25.91 | 23 | 5.046 | 25.35 |
| 24 | 5.375 | 27.04 | 24 | 5.265 | 26.48 |
| 25 | 5.593 | 28.17 | 25 | 5.484 | 27.60 |
| 26 | 5.811 | 29.29 | 26 | 5.702 | 28.73 |
| 27 | 6.029 | 30.42 | 27 | 5.920 | 29.86 |
| 28 | 6.246 | 31.55 | 28 | 6.138 | 30.98 |
| 29 | 6.463 | 32.67 | 29 | 6.354 | 32.11 |
| 30 | 6.678 | 33.80 | 30 | 6.571 | 33.24 |
| 31 | 6.894 | 34.93 | 31 | 6.786 | 34.36 |
| 32 | 7.109 | 36.05 | 32 | 7.001 | 35.49 |
| 33 | 7.323 | 37.18 | 33 | 7.216 | 36.62 |
| 34 | 7.537 | 38.31 | 34 | 7.430 | 37.74 |
| 35 | 7.750 | 39.43 | 35 | 7.643 | 38.87 |
| 36 | 7.962 | 40.56 | 36 | 7.856 | 40.00 |
| 37 | 8.174 | 41.69 | 37 | 8.068 | 41.12 |
| 38 | 8.385 | 42.81 | 38 | 8.279 | 42.25 |
| 39 | 8.596 | 43.94 | 39 | 8.490 | 43.38 |
| 40 | 8.805 | 45.07 | 40 | 8.701 | 44.50 |
| 41 | 9.015 | 46.19 | 41 | 8.910 | 45.63 |
| 42 | 9.223 | 47.32 | 42 | 9.119 | 46.76 |
| 43 | 9.431 | 48.45 | 43 | 9.327 | 47.88 |
| 44 | 9.638 | 49.57 | 44 | 9.535 | 49.01 |
| 45 | 9.845 | 50.70 | 45 | 9.742 | 50.14 |
| 46 | 10.051 | 51.83 | 46 | 9.948 | 51.26 |
| 47 | 10.256 | 52.95 | 47 | 10.154 | 52.39 |
| 48 | 10.460 | 54.08 | 48 | 10.358 | 53.52 |
| 49 | 10.664 | 55.21 | 49 | 10.562 | 54.64 |
| 50 | 10.867 | 56.33 | 50 | 10.766 | 55.77 |
| 51 | 11.069 | 57.46 | 51 | 10.968 | 56.90 |
| 52 | 11.271 | 58.59 | 52 | 11.170 | 58.02 |
| 53 | 11.472 | 59.71 | 53 | 11.371 | 59.15 |
| 54 | 11.672 | 60.84 | 54 | 11.572 | 60.28 |
| 55 | 11.871 | 61.97 | 55 | 11.771 | 61.41 |
| 56 | 12.069 | 63.10 | 56 | 11.970 | 62.53 |
| 57 | 12.267 | 64.22 | 57 | 12.168 | 63.66 |
| 58 | 12.463 | 65.35 | 58 | 12.365 | 64.79 |
| 59 | 12.659 | 66.48 | 59 | 12.562 | 65.91 |
| 60 | 12.855 | 67.60 | 60 | 12.757 | 67.04 |
| 61 | 13.049 | 68.73 | 61 | 12.952 | 68.17 |
| 62 | 13.242 | 69.86 | 62 | 13.146 | 69.30 |
| 63 | 13.435 | 70.99 | 63 | 13.339 | 70.42 |
| 64 | 13.627 | 72.11 | 64 | 13.531 | 71.55 |
| 65 | 13.818 | 73.24 | 65 | 13.722 | 72.68 |
| 66 | 14.008 | 74.37 | 66 | 13.913 | 73.81 |
| 67 | 14.197 | 75.50 | 67 | 14.102 | 74.93 |
| 68 | 14.385 | 76.62 | 68 | 14.291 | 76.06 |
| 69 | 14.572 | 77.75 | 69 | 14.479 | 77.19 |
| 70 | 14.759 | 78.88 | 70 | 14.666 | 78.32 |
| 71 | 14.944 | 80.01 | 71 | 14.852 | 79.44 |
| 72 | 15.129 | 81.14 | 72 | 15.037 | 80.57 |
| 73 | 15.312 | 82.26 | 73 | 15.221 | 81.70 |
| 74 | 15.495 | 83.39 | 74 | 15.404 | 82.83 |
| 75 | 15.677 | 84.52 | 75 | 15.586 | 83.96 |
| 76 | 15.858 | 85.65 | 76 | 15.767 | 85.08 |
| 77 | 16.037 | 86.78 | 77 | 15.948 | 86.21 |
| 78 | 16.216 | 87.91 | 78 | 16.127 | 87.34 |
| 79 | 16.394 | 89.03 | 79 | 16.305 | 88.47 |
| 80 | 16.571 | 90.16 | 80 | 16.482 | 89.60 |
| 81 | 16.746 | 91.29 | 81 | 16.659 | 90.73 |
| 82 | 16.921 | 92.42 | 82 | 16.834 | 91.86 |
| 83 | 17.095 | 93.55 | 83 | 17.008 | 92.98 |
| 84 | 17.267 | 94.68 | 84 | 17.181 | 94.11 |
| 85 | 17.439 | 95.81 | 85 | 17.353 | 95.24 |
| 86 | 17.610 | 96.93 | 86 | 17.524 | 96.37 |
| 87 | 17.779 | 98.06 | 87 | 17.694 | 97.50 |
| 88 | 17.947 | 99.19 | 88 | 17.863 | 98.63 |
| 89 | 18.115 | 100.32 | 89 | 18.031 | 99.76 |
| 90 | 18.281 | 101.45 | 90 | 18.198 | 100.89 |
| 91 | 18.446 | 102.58 | 91 | 18.364 | 102.02 |
| 92 | 18.610 | 103.71 | 92 | 18.528 | 103.15 |
| 93 | 18.773 | 104.84 | 93 | 18.692 | 104.27 |
| 94 | 18.935 | 105.97 | 94 | 18.854 | 105.40 |
| 95 | 19.095 | 107.10 | 95 | 19.015 | 106.53 |
| 96 | 19.255 | 108.23 | 96 | 19.175 | 107.66 |
| 97 | 19.413 | 109.36 | 97 | 19.334 | 108.79 |
| 98 | 19.570 | 110.49 | 98 | 19.491 | 109.92 |
| 99 | 19.726 | 111.62 | 99 | 19.648 | 111.05 |
| 100 | 19.880 | 112.75 | 100 | 19.803 | 112.18 |
| 101 | 20.034 | 113.88 | 101 | 19.957 | 113.31 |
| 102 | 20.186 | 115.01 | 102 | 20.110 | 114.44 |
| 103 | 20.337 | 116.14 | 103 | 20.262 | 115.57 |
| 104 | 20.487 | 117.27 | 104 | 20.412 | 116.71 |
| 105 | 20.636 | 118.40 | 105 | 20.562 | 117.84 |
| 106 | 20.783 | 119.53 | 106 | 20.710 | 118.97 |
| 107 | 20.929 | 120.66 | 107 | 20.856 | 120.10 |
| 108 | 21.074 | 121.79 | 108 | 21.002 | 122.36 |
| 109 | 21.218 | 122.93 | 109 | 21.146 | 122.36 |
| 110 | 21.470 | 124.06 | 110 | 21.289 | 123.49 |

The array 50 can be assembled according to the principles generally set forth in U.S. Pat. No. 4,331,380 and U.S. Pat. No. 4,359,267, whose contents are hereby incorporated by reference.

In summary, an exemplary two-row configuration has been disclosed, having the following characteristics.

1. The central fiber axes of each row lie along planes in the length direction which are tilted with respect to each other and with respect to a plane normal to the object and image planes.

2. The imaging faces of the fibers of adjoining rows are separated by a small distance.

3. The center lines of adjoining fibers in the width direction are offset from each other.

4. A plane through a centrally located fiber of one row only extending in the width direction makes a right angle with the object and image planes.

As a final point, as the data for the example set forth above indicates, the tilt angle $\phi$ and fiber end face spacings s are very small quantities. Also, the fiber-to-fiber tilt increments are very small. FIGS. 2–5 therefore depict greatly exaggerated tilt and spacing parameters for ease of description purposes.

What is claimed is:

1. A gradient index lens array having a plurality of gradient index optical fibers aligned in two rows, each fiber in each row having an axis which is substantially nonparallel to the axes of adjoining fibers, the array characterized by the optical axes of the fibers in each row being aligned along the same plane in the length direction, with the respective planes tilted away from each other and with the fiber exit faces of adjoining rows separated by a small distance, s.

2. The lens array of claim 1 where the tilt angle $\phi$ of the respective planes is provided by the expression:

$$\phi = \frac{s(l - m)}{2(mL + ml_0n_o + l_1n_0)}$$

where m is the magnification, L is the fiber length; $N_o$ is the axial refractive index, $l_o$ is the object vertex distance and $l_1$ is the image vertex distance.

3. An optical system for transmitting an image of an object lying in an object plane onto a parallel image plane at a magnification other than unity, said system comprising a gradient index lens array having a plurality of gradient index optical fibers aligned in two rows, the optical centers of each row lying along a symmetrical axis extending along the length direction of the lens array, each fiber in each row having an axis which is substantially nonparallel to the axes of adjoining fibers, the array further characterized by one row having a center fiber through which a plane extended in the width direction forms a right angle with said object and image planes and a second row of said fibers whose axes are offset with respect to the central fiber of said first row.

* * * * *